Nov. 24, 1942.   W. A. HARE   2,302,859
OVERHEAD FURNACE
Filed July 5, 1940   2 Sheets-Sheet 1
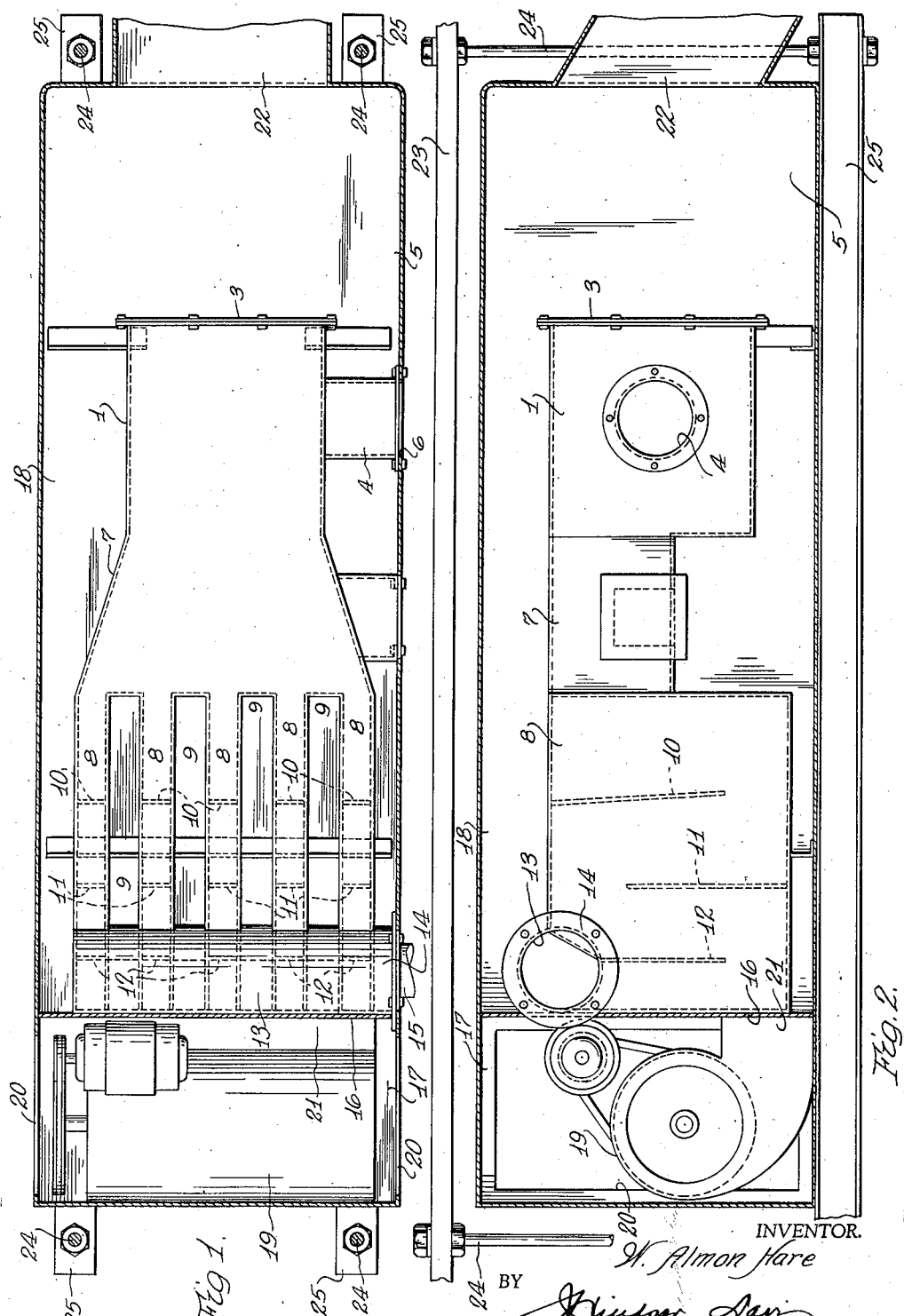
INVENTOR.
W. Almon Hare
BY
ATTORNEY.

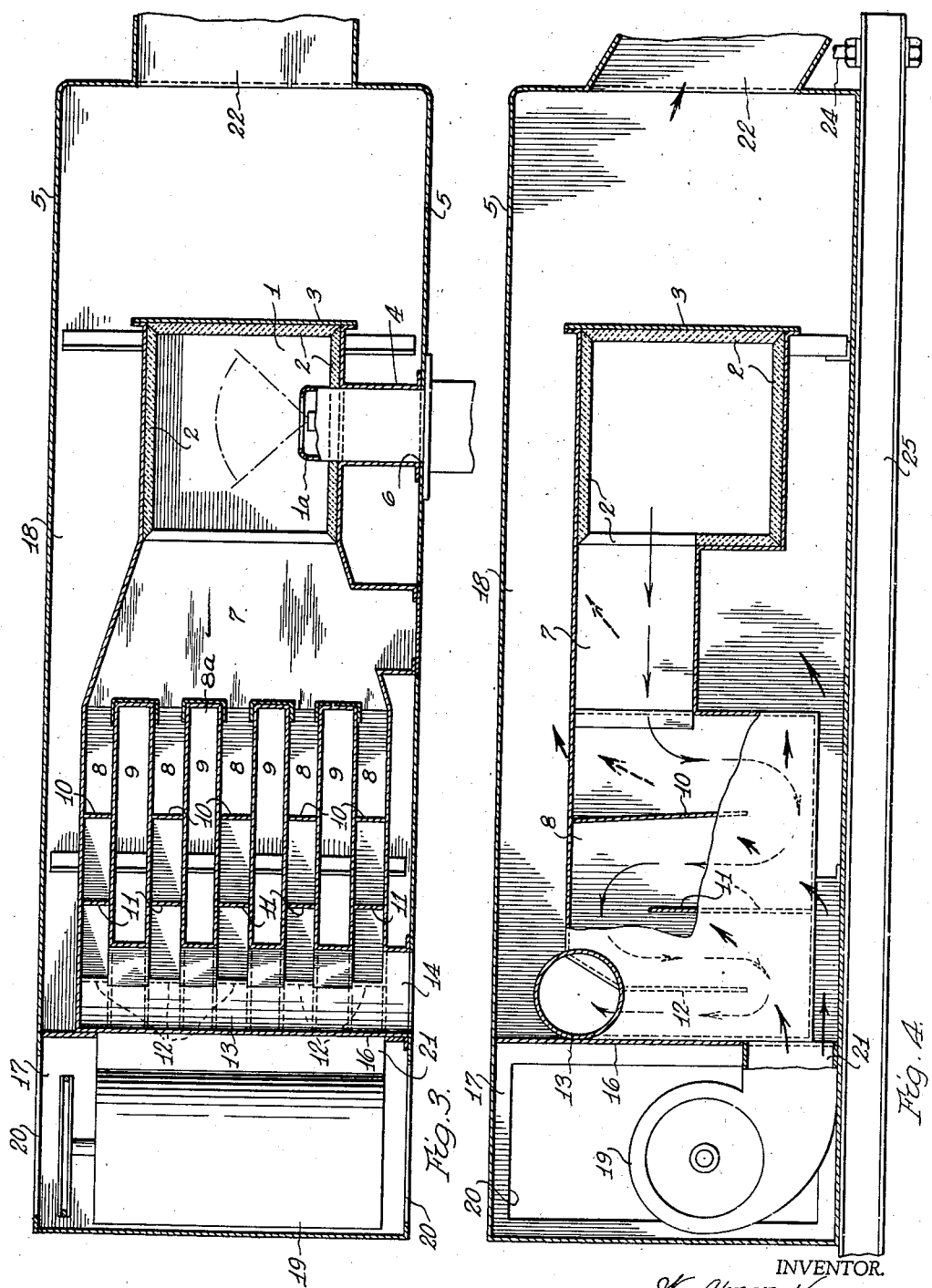

Patented Nov. 24, 1942

2,302,859

UNITED STATES PATENT OFFICE 2,302,859

OVERHEAD FURNACE

Wilfred Almon Hare, Windsor, Ontario, Canada

Application July 5, 1940, Serial No. 343,967

3 Claims. (Cl. 126—110)

This invention relates to furnaces and has for its primary object to provide a warm air furnace adapted to be suspended from an overhead support in a building so as to leave the floor space therebeneath free for occupancy by furniture, machinery, etc. Although particularly adapted for use in large buildings such as garages and factories, where unobstructed use of all floor space is highly desirable, it will be understood that the present furnace may also be used as a domestic heating plant by the addition of suitable air conduits thereto for conveying heated air to rooms to be heated. When used for domestic purposes, the furnace may be suspended from a basement or attic ceiling, in which case it leaves the floor of the basement therebeneath unobstructed and suitable for use as a recreation room.

An important object of the invention is to provide a furnace wherein the heated products of combustion are conveyed in a sinuous, generally horizontal path from the combustion chamber to the outlet flue, and wherein the air to be heated travels generally horizontally in a direction opposite to the direction the products of combustion travel. The opposed flow of the combustion gases and the air to be heated provides a more efficient heat transfer than when they flow in like directions inasmuch as the air to be heated first contacts the lower temperature zone of the furnace and as it is heated by such contact it moves into contact with the higher temperature zones. This provides what might be termed a progressive heating function wherein the air continuously moves from contact with one heated zone to another zone of higher temperature.

Another object is to provide a furnace of the type above referred to embodying a heat exchanger including passages for leading the products of combustion from the fire-box to the flue which are characterized by vertical walls which avoid settlement areas for soot and dust on the heat exchanger surfaces. A settlement of soot or dust obviously acts as an insulation, tending to reduce the efficiency of the heat transfer.

Other objects and advantages will become more fully apparent as reference is had to the accompanying drawings wherein my invention is illustrated, and in which Fig. 1 is a plan view of the furnace, with the top housing wall removed, Fig. 2 is a side elevation, with the front wall removed, Fig. 3 is a horizontal cross section, and Fig. 4 is a staggered vertical cross section.

More particularly, 1 designates a fire box or combustion chamber of substantially cubiform shape, lined with refractory material 2, and having a removable end wall 3. The cubiform shape is preferred because by employing linings of refractory material with bevelled edges, as shown, the same sized linings are used on top, bottom, sides and cover or end wall 3 of the fire-box. This is desirable from the standpoint of standardizing production and for replacing linings.

In one of the side walls of the fire-box is a tubular extension 4 to the front wall of the furnace housing 5, which has an opening 6, coinciding with the extension 4, in order that a fluid fuel burner may be mounted in the extension. A fragment of an oil burner is illustrated at 1a in Fig. 3, which is of the so-called "ball-flame" type. The burner 1a, it will be noted, is disposed so that the flame is directed horizontally, in a direction at right angles to the horizontal direction the products of combustion travel in leaving the fire-box.

The products of combustion leave the fire-box by horizontal travel into a manifold portion or distributor chamber 7, which is of smaller vertical cross sectional area than the vertical cross sectional area of the fire-box. The manifold portion or distributing chamber 7 distributes the products of combustion from the fire-box to a multiplicity of horizontally extending, vertical side-walled passages 8 which are separated one from another by vertically and horizontally extending air passages 9. The passages 8 extend downwardly and their lower walls, which are horizontal, are in a plane below the horizontal plane of the bottom of the distributing chamber 7. The end walls of the passages 8, which are exposed to the distributing chamber 7, are protected by stainless steel guards 8a which tend to reduce corrosion which results from impingement of the high temperature combustion gases thereagainst.

The products of combustion pass through the distributing chamber 7 and are caused to flow downwardly by substantially vertical baffles 10 in the passages 8. After passing beneath the baffles 10 the gases flow upwardly over vertical baffles 11, then downwardly beneath the baffles 12, and finally upwardly to a flue chamber or manifold 13. Thus it will be seen that although the gas flow is sinuous, it is generally horizontal.

The flue manifold 13 has an extension 14 opening through the adjacent wall of the housing 5, and has a flue pipe 15 connected thereto.

The housing 5 has a transverse wall 16 dividing it into two compartments 17 and 18. The heating and heat transfer unit above described is contained within the compartment 18 and a centrifugal air blower 19 is mounted in the compartment 17. The housing 5 has openings 20 enabling entrance of air into the compartment 17 and the air so entering passes through the outlet 21 of the blower into the compartment 18. The air entering the compartment 18 bathes the sides of the entire unit above described and also passes vertically and horizontally through the passages 9. The flow of air is illustrated in Fig. 4 by heavy arrows, while the flow of combustion gasses is illustrated by light arrows.

The housing 5 is illustrated as having a downwardly directed outlet 22 through which the heated air is finally discharged. It will be understood that a multiplicity of outlet ports 22 may be provided if desired, or that the outlet instead of being downwardly directed might have the usual air conduits connected thereto for distributing heated air to rooms. The downwardly inclined outlet is used when the furnace is suspended from an overhead support, such as indicated at 23. The supporting means in such a case comprises vertical rods 24 connected to the support 23 and to beams 25 extending beneath the furnace.

Although a specific embodiment of the invention has been illustrated and described, it will be understood that various changes may be made within the scope of the appended claims without departing from the spirit of the invention, and such changes are contemplated.

What is claimed is:

1. In a hot air furnace, a horizontal assembly composed of a firebox, a fluid fuel burner, a distributing chamber, a multiplicity of gas passages, a multiplicity of air passages, and a flue-chamber, said fuel burner being disposed to direct a flame horizontally into said fire box, said distributing chamber extending horizontally from said fire-box and connecting said fire-box with said gas passages, said gas passages extending horizontally and connecting said distributing chamber with said flue chamber and having a multiplicity of baffles therein forming a multiplicity of sinuous passageways for travel of gases from said distributing chamber to said flue chamber, said baffles being so arranged that the cross sectional area of the passageways is progressively reduced as they approach the flue-chamber, said air passages being arranged between said gas passages and spacing said gas passages one from another horizontally, a housing enclosing the entire assembly, said housing having an air inlet adjacent the flue chamber and an air outlet adjacent the combustion chamber and being so spaced with respect to said fire-box that an air space is present between all sides of the fire-box and the adjacent housing walls, and means for circulating air through the housing.

2. In a hot air furnace, a horizontal assembly composed of a fire-box, a fluid fuel burner, a distributing chamber, a multiplicity of gas passages, a multiplicity of air passages, and a flue chamber, said distributing chamber being of a smaller cross-sectional area than the fire-box and extending horizontally from the upper portion of a sidewall thereof at right angles to the direction of the flame, said gas passages extending downwardly beneath the horizontal plane of the distributing chamber and being connected at their tops to said distributing chamber, said gas passages having baffles therein for directing gases through a sinuous path a part of which is below the horizontal plane of the distributing chamber, said gas passages being connected to said flue chamber, said air passages being disposed between the gas passages to space the latter horizontally, said air passages being open at their tops, bottoms and end portion beneath the distributing chamber, a housing enclosing the entire assembly and spaced with respect to the fire-box to provide an air space on all sides of the fire-box, said housing having an air inlet adjacent the flue chamber and an air outlet adjacent the fire-box, and means for circulating air through said housing.

3. A furnace comprising a fire-box, said fire-box having a lateral extension for receiving a fluid fuel burner for supporting the burner in a position to direct a flame horizontally into the fire-box, a distributor chamber connected to said fire-box and extending outwardly horizontally therefrom at right angles to said lateral extension, a multiplicity of gas passages extending outwardly horizontally from said distributor chamber and having vertical side walls separated by air passages, the end walls of said passages which are exposed to said distributing chamber being covered by heat and flame resistant guards, a flue-chamber connecting the outer ends of the gas passages, a housing enclosing the entire furnace, said housing having an air inlet adjacent the flue-chamber and an air outlet adjacent the fire-box, and means for circulating air through the housing, said fire-box being spaced from the walls of said casing whereby air from said circulating means flows around all sides thereof.

WILFRED ALMON HARE.